United States Patent
Gutlapalli et al.

(10) Patent No.: US 9,594,784 B2
(45) Date of Patent: Mar. 14, 2017

(54) PUSH-MODEL BASED INDEX DELETION

(75) Inventors: Hari K. Gutlapalli, Union City, CA (US); Shirish K. Kothari, Fremont, CA (US); Suhas R. Mehta, San Jose, CA (US); Wai Pak, Hercules, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1090 days.

(21) Appl. No.: 11/875,466

(22) Filed: Oct. 19, 2007

(65) Prior Publication Data
US 2009/0106324 A1    Apr. 23, 2009

(51) Int. Cl.
*G06F 17/00* (2006.01)
*G06F 17/30* (2006.01)

(52) U.S. Cl.
CPC ............... *G06F 17/30321* (2013.01)

(58) Field of Classification Search
CPC ......... G06F 17/30362; G06F 17/30578; G06F 9/466; G06F 17/30607; G06F 11/2064; G06F 11/2069; G06F 11/2074; G06F 11/2076; G06F 11/2079; G06F 2201/855; G06F 8/20; G06F 9/4428; G06F 9/4435; G06F 9/46
USPC ... 707/687, 696, 999.201, 999.202, E17.002
See application file for complete search history.

(56) References Cited

U.S. PATENT DOCUMENTS

| | | | |
|---|---|---|---|
| 5,561,795 A | 10/1996 | Sarkar | |
| 5,576,945 A * | 11/1996 | McCline | G06F 9/44521 700/2 |
| 5,701,480 A | 12/1997 | Raz | 718/101 |
| 5,907,848 A * | 5/1999 | Zaiken | G06Q 40/02 |
| 5,970,488 A * | 10/1999 | Crowe et al. | 707/656 |
| 6,026,406 A | 2/2000 | Huang et al. | 707/100 |
| 6,182,063 B1 * | 1/2001 | Woods | 707/3 |
| 6,205,449 B1 | 3/2001 | Rastogi et al. | |
| 6,366,907 B1 * | 4/2002 | Fanning et al. | 707/3 |
| 6,385,626 B1 * | 5/2002 | Tamer et al. | 707/203 |
| 6,516,337 B1 | 2/2003 | Tripp et al. | 709/202 |
| 6,542,883 B1 * | 4/2003 | Salo | |
| 6,564,219 B1 * | 5/2003 | Lee et al. | 707/100 |
| 6,618,822 B1 | 9/2003 | Loaiza et al. | 714/20 |
| 6,834,276 B1 * | 12/2004 | Jensen et al. | |
| 6,950,834 B2 | 9/2005 | Huras et al. | 707/610 |
| 6,976,053 B1 * | 12/2005 | Tripp et al. | 709/202 |
| 6,993,530 B2 * | 1/2006 | Lee et al. | 707/100 |
| 6,993,537 B2 | 1/2006 | Buxton et al. | 707/401 |
| 6,999,957 B1 * | 2/2006 | Zamir et al. | 707/3 |
| 7,243,088 B2 | 7/2007 | Verma et al. | 707/695 |
| 7,340,454 B2 * | 3/2008 | Wu et al. | 707/3 |
| 7,587,428 B2 | 9/2009 | Barabas et al. | |
| 7,685,106 B2 * | 3/2010 | Brooks et al. | 707/999.003 |

(Continued)

*Primary Examiner* — Yicun Wu
(74) *Attorney, Agent, or Firm* — Sheppard, Mullin, Richter & Hampton LLP

(57) ABSTRACT

A method and apparatus for push-model based index deletion. In one embodiment of the method, a first transaction is generated for deleting a first data object from memory. A first message is generated in response to generating the first transaction, wherein the first message comprises information related to an identifier of the first data object, and wherein the first message comprises information that indicates that the first data object was or will be deleted. The first message is then transmitted to a computer system that implements a search engine.

18 Claims, 5 Drawing Sheets

(56) References Cited

U.S. PATENT DOCUMENTS

| | | | |
|---|---|---|---|
| 7,689,560 B2 | 3/2010 | Barabas et al. | 707/999.008 |
| 7,730,069 B2 | 6/2010 | Yamamoto et al. | 707/741 |
| 7,917,516 B2 | 3/2011 | Loofbourrow et al. | 707/741 |
| 8,001,088 B2 | 8/2011 | Tawa, Jr. | 707/673 |
| 8,010,497 B2 | 8/2011 | Verma et al. | 707/662 |
| 8,131,691 B1 | 3/2012 | Nagaralu et al. | 707/696 |
| 2002/0055920 A1* | 5/2002 | Fanning et al. | 707/3 |
| 2002/0078134 A1* | 6/2002 | Stone et al. | 709/202 |
| 2002/0087500 A1 | 7/2002 | Berkowitz et al. | 707/1 |
| 2002/0194205 A1* | 12/2002 | Brown et al. | 707/200 |
| 2003/0131005 A1 | 7/2003 | Berry | 707/10 |
| 2003/0191737 A1* | 10/2003 | Steele et al. | 707/1 |
| 2003/0233370 A1 | 12/2003 | Barabas et al. | 707/103 R |
| 2004/0225865 A1* | 11/2004 | Cox et al. | 712/34 |
| 2004/0267807 A1 | 12/2004 | Barabas et al. | 707/103 R |
| 2005/0021567 A1 | 1/2005 | Holenstein et al. | 707/200 |
| 2005/0027702 A1* | 2/2005 | Jensen et al. | 707/3 |
| 2005/0076023 A1* | 4/2005 | Wu et al. | 707/3 |
| 2005/0149525 A1 | 7/2005 | Verma et al. | 707/8 |
| 2006/0074977 A1 | 4/2006 | Kothuri et al. | 707/104.1 |
| 2006/0095405 A1* | 5/2006 | Anderson et al. | 707/3 |
| 2006/0242443 A1 | 10/2006 | Talius et al. | 713/400 |
| 2006/0248039 A1* | 11/2006 | Brooks et al. | 707/1 |
| 2007/0050333 A1 | 3/2007 | Vogler | 707/3 |
| 2007/0143351 A1 | 6/2007 | Sawaya et al. | 707/200 |
| 2007/0208716 A1 | 9/2007 | Krishnaprasad et al. | 707/3 |
| 2007/0226277 A1 | 9/2007 | Holenstein et al. | 707/204 |
| 2007/0233720 A1* | 10/2007 | Bae et al. | 707/101 |
| 2007/0244857 A1 | 10/2007 | Yu | 707/3 |
| 2008/0005092 A1* | 1/2008 | Kleewein et al. | 707/4 |
| 2008/0005097 A1 | 1/2008 | Kleewein et al. | 707/5 |
| 2008/0065597 A1 | 3/2008 | Vedula | 707/3 |
| 2008/0082782 A1* | 4/2008 | Meijer et al. | 711/207 |
| 2008/0097993 A1 | 4/2008 | Nanba | 707/6 |
| 2008/0162425 A1 | 7/2008 | Grennan et al. | 707/3 |
| 2008/0281807 A1 | 11/2008 | Bartlang et al. | 707/5 |
| 2008/0301087 A1 | 12/2008 | Bernard | 707/2 |
| 2009/0049043 A1* | 2/2009 | Weinman, Jr. | 707/6 |
| 2009/0094236 A1 | 4/2009 | Renkes et al. | 707/6 |
| 2009/0106196 A1 | 4/2009 | Gutlapalli | 707/200 |
| 2009/0106216 A1 | 4/2009 | Gutlapalli | 707/4 |
| 2009/0106325 A1 | 4/2009 | Gutlapalli | 707/202 |
| 2009/0112947 A1 | 4/2009 | Bourbonnais et al. | 707/204 |

\* cited by examiner

| Entry | Keyword | Record Identifier |
|---|---|---|
| 1 | KW1 | R5, R12, R250 |
| 2 | KW2 | R200, R11, R12 |
| 3 | KW3 | R12, R13, R100 |
| 4 | KW4 | R70, R300 |
| ⋮ | ⋮ | ⋮ |
| n | KWn | R7, R8, R102 |

32

| Entry | Action Type | Table Name | Row Number | TS | Record Data |
|---|---|---|---|---|---|
| 1 | D | A | 5 | TS1 | D1 |
| 2 | M | B | 25 | TS2 | D2 |
| 3 | I | C | 5 | TS3 | D3 |
| ⋮ | ⋮ | ⋮ | ⋮ | ⋮ | ⋮ |
| p | I | A | 71 | TSp | Dp |

PUSH-MODEL BASED INDEX DELETION

BACKGROUND

A search engine is an information retrieval system that is designed to help users find information. Search engines help to minimize the time required to find information of interest and the amount of information which must be consulted. The most popular form of search engine is a Web search engine which searches for information on the public World Wide Web. Other kinds of search engines include enterprise search engines, which can search for information stored in, for example, records in one or more databases on an intranet.

Search engines provide a search interface that enables a user to specify search criteria. Search engines identify data objects (e.g., documents, database records, etc.) that contain information that match the specified search criteria. Word searching is the most popular form of search, and a search match occurs when a data object contains a word or words that are specified in a user query. The present invention will be described with reference to word searching, it being understood that the present invention should not be limited thereto.

There are several varieties of syntax in which a search engine user can express a query. Some methods are formalized and require a strict, logical and algebraic syntax. The query can be quite simple, a single word at minimum. Building a more complex query may require the use of Boolean operators (e.g., AND, OR, NOT, etc.) that allow a user to refine and extend the terms of the search. Other approaches are less strict and allow for a less defined query.

SUMMARY

In one embodiment of the method, a first transaction is generated for deleting a first data object from memory. A first message is generated in response to generating the first transaction, wherein the first message comprises information related to an identifier of the first data object, and wherein the first message comprises information that indicates that the first data object was or will be deleted. The first message is then transmitted to a computer system that implements a search engine.

BRIEF DESCRIPTION OF THE DRAWINGS

The example embodiments may be better understood, and its numerous objects, features and advantages made apparent to those skilled in the art by referencing the accompanying drawings.

DETAILED DESCRIPTION

Figures 1, 2:
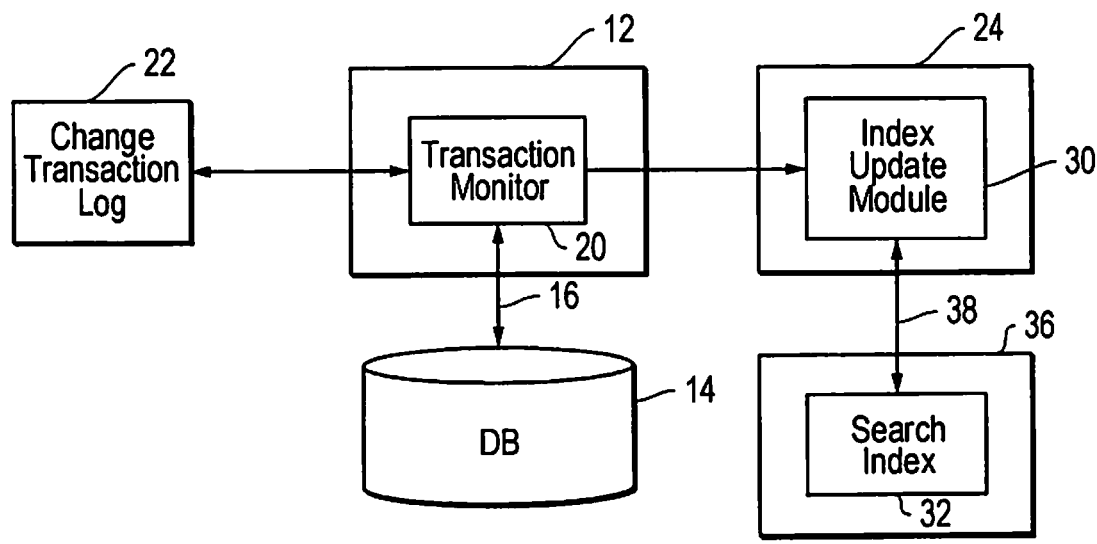
FIG. 1 is a simplified block diagram of a data processing system.
FIG. 2 is a graphical representation of an example search index.

Search engines typically use one or more search indexes to quickly locate data objects that match search criteria (i.e., contain words specified in a search query). Without a search index, the search engine may need to scan every data object in a corpus, which would take a considerable amount of time and computing power, in order to find data objects whose contents match the search criteria. Using a search index, for example, 10,000 data objects can be queried for specified words within milliseconds, whereas a sequential scan of every word in the data objects, could take hours, especially if the data objects are large. No search engine user would be comfortable waiting several hours to get search results. The trade off for the time saved during information retrieval is that additional computer storage is required to store the search index, and that it takes time for the search engine to create and update the search index. In some instances, users cannot submit a search query while the search engine is creating or updating a search index.

Search indexes vary in architecture to meet various design factors such as the amount of memory needed to store the index, how to store the index data (e.g., whether index information should be data compressed), etc. In general, search indexes contain entries, each of which maps a keyword to one or more identifiers that identify respective data objects that contain one or more instances of the keyword. Search indexes may include additional information such as the frequency (i.e., the number of instances) of each keyword in the data objects or the positions of the keyword in data objects.

Search engines use search indexes to identify one or more data objects that contain one or more keywords that are identified in a search query. Once identified, the search engine can sort the identified data objects according to relevance using, for example, keyword position and/or keyword frequency information mentioned above. The sorted data objects are then presented to the user in a search results list. Placing the most relevant data objects first in the search result list, along with content snippets thereof, reduces the time required by users to determine whether one or more of the identified data objects are sufficiently similar to the query.

The initial creation of a search index is a process well understood by those of ordinary skill in the art. Once created, search indexes should be updated to reflect changes (i.e., deletions, modifications, or new insertions) of data objects in the corpus. If search indexes are not updated, search engines that use the index may generate search result lists that are less than accurate. For example, suppose a data object is deleted from the corpus after the search index is first created. If the search index is not updated, the search index will inaccurately map one or more keywords that were contained in the deleted data object to the data object's identifier. Further suppose the search engine receives a query from a user that specifies a keyword that was contained in the deleted data object. In response to receiving the query, the search engine will access the search index using the specified keyword, identify the deleted data object as containing the keyword, and generate a search result list that contains the deleted data object. Only when the user attempts to access the data object after seeing the results list will the user learn that the data object has been deleted.

Search indexes should be updated so that they accurately reflect changes to a corpus of data objects. In other words, search indexes should be updated soon after data objects in the corpus have been deleted, modified or newly inserted. An apparatus or method for updating a search index is described below. The method or apparatus can be implemented as one or more computer programs executing on one or more processors of one or more computer systems, although those skilled in the art will readily recognize that the equivalent of such software may also be constructed in hardware or a combination of hardware and software. If the method or apparatus is implemented as a computer program, the program may be stored on one or more conventional computer readable mediums that may include, for example: magnetic storage media such as a magnetic disk (e.g., a disk drive); optical storage media such as an optical disk; solid state electronic storage devices such as random access memory (RAM), or read only memory (ROM); or any other device or medium employed to store computer program instructions.

A transaction monitor is described below for detecting transactions that modify or delete existing data objects of a corpus, or change transactions that insert new data objects into the corpus. For purposes of explanation only, the term modification is defined to include overwriting data within an existing data object with new data, removing some of the data without replacing it, or appending new data to an existing data object. In one embodiment, the transaction monitor, either before or after a data object is modified, deleted, or inserted in accordance with a corresponding change transaction, generates and sends an update index message to a search engine that has access to a search index that is associated with the corpus of data objects. This update index message may include information unique to the corresponding change transaction. For example, if the change transaction is configured for deleting a first data object, the corresponding update index message that is generated by the monitor may include an identifier of the first data object or information which can be used to generate the identifier of the first data object. Additionally, the update index message may include an indication that the first data object was or will be deleted, although the indication can merely indicate that a data object is being removed.

Update index messages can also be generated in response to the transaction monitor detecting a transaction to modify an existing data object or a transaction to insert a new data object. If the corresponding change transaction is configured to modify an existing data object or insert a new data object into the corpus, the corresponding update index message generated by the monitor and sent to the search engine, may contain an identifier of the first data object (i.e., the modified or inserted data object or the data object to be modified or inserted) or information which can be used to generate the identifier of the first data object. The update index message may include an indication that the first data object will be or was modified or inserted into the corpus, although the indication can merely indicate that a data object is being removed. Further, in situations where the corresponding transaction is one to modify or insert a new data object, the update index message generated and transmitted to the search engine may include some or all of the contents of the data object or enough information about the data object to enable the search engine to identify keywords within the data object that should be included in or removed from the search index.

An update index module may be provided to update the search index in response to the search engine receiving the update index messages mentioned above. For example, when the search engine receives an update index message that a data object has been or will be deleted, the update index module may generate an identifier for the deleted data object using information contained within the update index message, if the message does not already include the identifier for the data object. Next update index module can delete all instances of the data object identifier that are contained within entries of the search index, which are mapped to keywords. Here, it is noted that the search engine need not access the corpus of data objects in order to identify deleted data objects. In other words, the search engine need not pull information from the corpus of data objects when it is time to update a search index. Rather, the transaction monitor pushes information to the search engine that is needed to update the search index.

When the update index module message received by the search engine indicates that a data object has been or will be inserted, the update index module may generate an identifier for the inserted data object using information contained within the update index message, if the message does not already include the data object identifier. Next, the search engine or the update index module can identify keywords that are contained within the inserted data object using information that is contained within the update index message. Here, it is noted that the search engine need not access the actual, newly inserted data object in order to identify keywords contained therein. Rather, the update index message transmitted by the transaction monitor, should contain some or all of the contents of the newly inserted data object, or enough information to enable the search engine or the update index module to identify keywords of the newly inserted data object. Once the keywords are identified, the update index module may add the identifier of the newly inserted data object to each entry of the search index that contains the identified keywords. If the search index lacks one of the keywords identified in the newly inserted data object, the update index module may create a new entry in the search index, add the keyword and map the data object's identifier thereto.

When the search engine receives a message indicating that a corresponding data object has been modified, the update index module may generate an identifier for the modified data object using information contained within the message, if the message does not already include the data object identifier. The search engine or the update index module may then identify keywords contained within modified data object using information supplied in the update index message that was received from the transaction monitor. Here, again, the search engine need not access the actual, modified data object to identify the keywords contained therein. Rather, the message received by the search engine may include some or all of the data contents of the modified data object, or enough information to enable the search engine or the update index module to identify the keywords contained within the modified data object. Thereafter, the update index module may access the search index and add the identifier of the modified data object to entries of the search index that contain the identified keywords, if the entries do not already include the modified data object's identifier. If the search index does not include an identified keyword of the modified data object, the update index module may create a new entry and add this missing keyword and the modified data object's identifier mapped thereto. Lastly, the search engine may delete all instances of the modified data object's identifier in the search index that are mapped to keywords that are no longer contained within the modified data object.

The present invention can be used to update search indexes in which keywords are mapped to one or more data object identifiers. While the data objects can take any structured or unstructured form, the present invention will be described with reference to data objects that take form in records within database tables, it being understood that the present invention should not be limited thereto. FIG. 1 illustrates in block diagram form, relevant components of a data processing system 10, which includes a memory system that stores one or more databases. The present invention will be described with reference to a single database, it being understood that the present invention should not be limited thereto. Moreover, the present invention should not be limited to the system shown in FIG. 1.

System 10 includes an application program 12 executing on a computer system (not shown) such as a server. Application 12 is in data communication with a memory system 14 via communication link 16, which although not shown may include one or more software and/or hardware components such as I/O drivers, volume managers, database managers, routers, switches, etc. Memory system 14 may take form in one or more memory devices such as disk arrays. Memory system 14 stores a database, which includes one or more tables, each of which is uniquely identified by a name. Each table includes one or more records, each of which is uniquely identified by a row number. Each record contains fields or columns of data. Each record is accessible by a database manager (not shown), which are well known to those skilled in the art. For the purposes of explanation only, it will be presumed that memory system 14 contains a single database named DB, which in turn contains three tables named Table A, Table B, and Table C.

Application 12 has access to records within the database tables of memory system 14 via communication link 16. More particularly, application 12 is configured to generate transactions including those for (1) deleting existing records from memory system 14, (2) inserting new records into memory system 14, or (3) modifying existing records within memory system 14. Application 12 may generate these transactions in response to receiving requests from client computer systems (not shown) in data communication therewith. As shown in FIG. 1, application 12 includes a transaction monitor 20 in data communication with a change transaction log 22, both of which will be more fully described below.

Application 12 in general and transaction monitor 20 in particular, is in data communication with a search engine 24 via communication link 26. While the present invention can be employed with any type of search engine, the present invention will be described with reference to using an enterprise search engine, it being understood that the present invention should not be limited thereto. Search engine 24 may take form in instructions executing on a computer system (not shown) such as a server. Although not shown, search engine 24 may be in data communication with other transaction monitors (not shown) executing on other computer systems that have access database records that are stored in memory system 14. These other transaction monitors could operate in a fashion similar to the operation of transaction monitor 20, which is more fully described below.

Search engine 24 includes an index update module 30, which is in data communication with transaction monitor 20 via communication link 26, which may include one or more hardware and/or software components such as drivers, switches, routers, etc. Update index module 30 is also in data communication with a memory device 36 via communication link 38, which like communication link 16, may include one or more hardware and/or software components such as file system managers, switches, etc. Memory device 36 stores a search index 32 that is related to the database DB in memory system 14, and which will be more fully described below. In general, update module 30 is configured to update search index 32 in accordance with update index messages received directly or indirectly from transaction monitor 20.

FIG. 2 graphically illustrates relevant contents of an example search index 32 that was created by search engine 24. Search index 32 includes n entries, each of which contains a keyword (e.g., keyword KW1) mapped to one or more record identifiers (e.g., RI5, RI12, and RI250) that identify respective records within the database DB of memory system 14. Search index 32 maps a keyword to a record identifier if the corresponding record contains at least one instance of the keyword. Search engines create search indexes, such as search index 32, using a process that is well understood by those of ordinary skill in the art. It is noted that search index 32 need not include every word contained within a particular record, but search index 32 should include those keywords that search engine 24 deems may be relevant to future search queries.

Search index 32 uses record identifiers (e.g., RI5) to identify records of the database in memory system 14. Record identifiers can be generated in one of many ways. However, all record identifies should be generated in the same manner and each should uniquely identify a particular record within memory system 14. For purposes of explanation only, each record identifier (e.g., RI5) of search index 32 is generated by concatenating a row number of the corresponding record and a table name (e.g., Table A, Table B, or Table C) of the table that contains the corresponding record. To illustrate, the database of memory system 14, as noted above, contains at least three tables named Table A, Table B, and Table C. Table A may include 100 records that are identified by row numbers 1-100, respectively; Table B may include 200 records that are identified by row numbers 1-200, respectively, and; Table C may include 300 records, which are identified by row numbers 1-300, respectively. The record identifier for the record in the second row of Table A may be generated as TableA:Row2; the record identifier for the record in the fifth row of Table B may be generated as TableB:Row5, and; the record identifier for the record in the eight row of Table C may be generated as TableC:Row8. It is noted, however, the foregoing is one example of record identifier structure, and the term data object identifier should not be limited to an identifier that is a concatenation of a table name and the row number of a record contained within that table.

Transaction monitor 20 monitors record changing transactions generated by application 12, including those that delete existing records, modify existing records, or insert new records into the database of memory system 14. Transaction monitor 20 generates update index messages in response to detecting the generation of transactions that change (i.e., delete, modify, or insert) records within the database. Index update module 30 can update search index 32 in accordance with the update index messages generated by and received from transaction monitor 20. Each of these messages may include information (e.g., the row number of the record that was or will be changed and the name of the table that contains the record that was or will be changed), which update module 30 can use to generate a record identifier for the corresponding record that was or will be changed. Alternatively, each of the update index messages received by update module 30 may include the record identifier of the record was or will be changed. However, for purposes of explanation only, it will be presumed that each of the update index messages that are received by update module 30, will include information (e.g., the row number of the record that was or will be changed and the name of the table that contains the record that was or will be changed), which update module 30 can use to generate a record identifier.

Figures 3, 4:
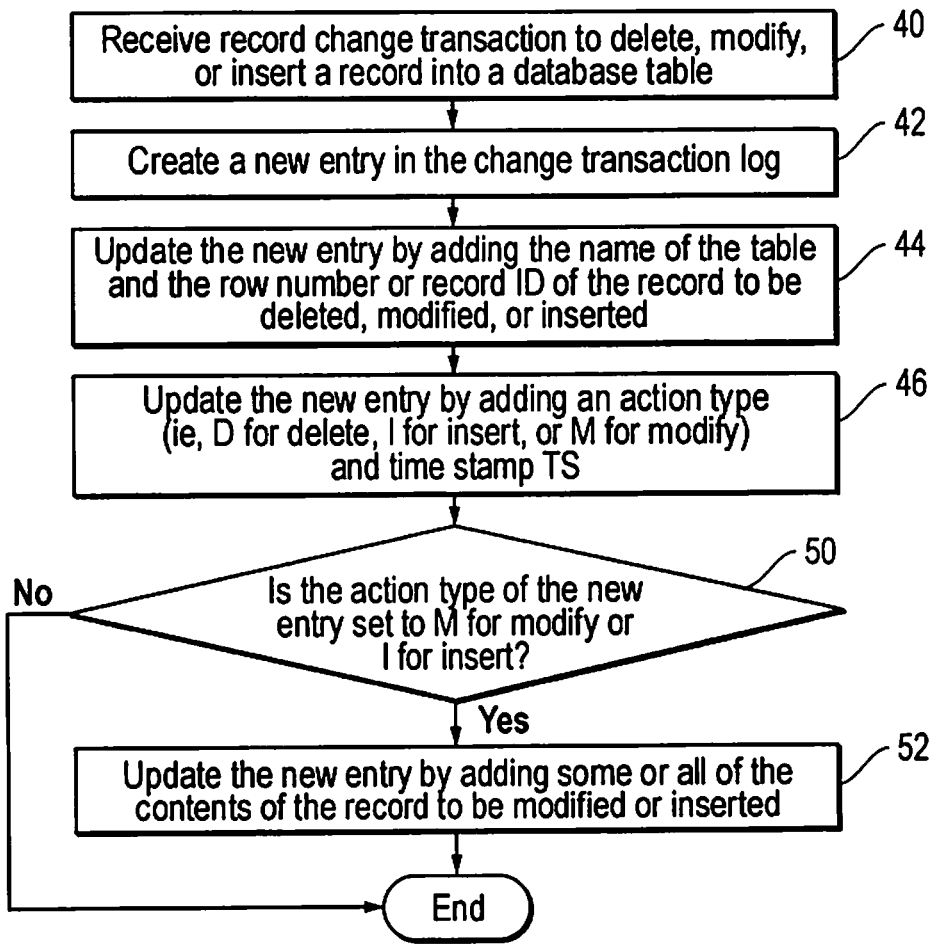
FIG. 3 is a flow chart illustrating relevant aspects of an example process implemented by the transaction monitor of FIG. 1.
FIG. 4 is a graphical representation showing relevant aspects of an example transaction log employed in the system of FIG. 1.

FIG. 3 is a flow chart illustrating relevant aspects of an example process implemented by transaction monitor 20. In response to detecting a change transaction that was generated by application 12, transaction monitor 20 accesses change transaction log 22 and creates a new entry therein as shown in step 42. In general, transaction log 22 contains one or more entries each one of which stores information regarding information about a record that was or will be changed. FIG. 4 is a graphical representation showing relevant aspects of an example transaction log 22. As seen, change transaction log 22 of FIG. 4 includes p entries, each one of which corresponds to a transaction generated by application 12 for deleting a record, modifying a record, or inserting a new record into the database DB of memory system 14. Transaction monitor 20 can create each entry before or after the corresponding record change transaction is implemented. Information added to each entry by transaction monitor 20 may be derived from the corresponding record change transaction, returned from another component (e.g., database manager) of system 10 in response to a request generated by transaction monitor 20, or a combination thereof.

Each entry within the change transaction log 22 shown in FIG. 4 includes an action type which defines the corresponding change transaction type of (i.e., delete, modify, or insert), a timestamp indicating the time when the corresponding change transaction was generated by application 12 or the time when the corresponding change transaction was completed, a table name that contains the record that is the target of the corresponding change transaction, a row number of the target record, and optionally some or all of the data contents of the record that is the subject of the corresponding change transaction or other information that can be used to identify keywords in the target record. It is noted that entries of change transaction log 22 need not include a copy of some or all of the data contents of corresponding target records. Rather, change transaction log 22 may include a pointer in each entry to a memory location where data contents of the target record can be read and copied into an update index message. Moreover, in one embodiment, change transaction log 22 need not include a copy of some or all of the data contents for a record that was or will be deleted. However, for purposes of explanation, it will be presumed that each entry of change transaction log 22 will include a copy of the data content of the record that was or will be modified, deleted, or inserted in accordance with a corresponding change transaction.

Returning to FIG. 3 and with continued reference to FIGS. 1 and 4, transaction monitor 20 creates a new entry in the change transaction log 22 in response to receiving or detecting an application generated transaction to delete, modify, or insert a record as shown in step 42. In response, as shown in step 44, transaction monitor 20 updates the newly created entry by adding into the appropriate columns: the table name that contains the target record; the row number of the target record; the action type (i.e., D for delete record, M for modify record, or I for insert record) of the change transaction received in step 40; a timestamp TS, and; a copy of the target record data contents.

Figure 5:
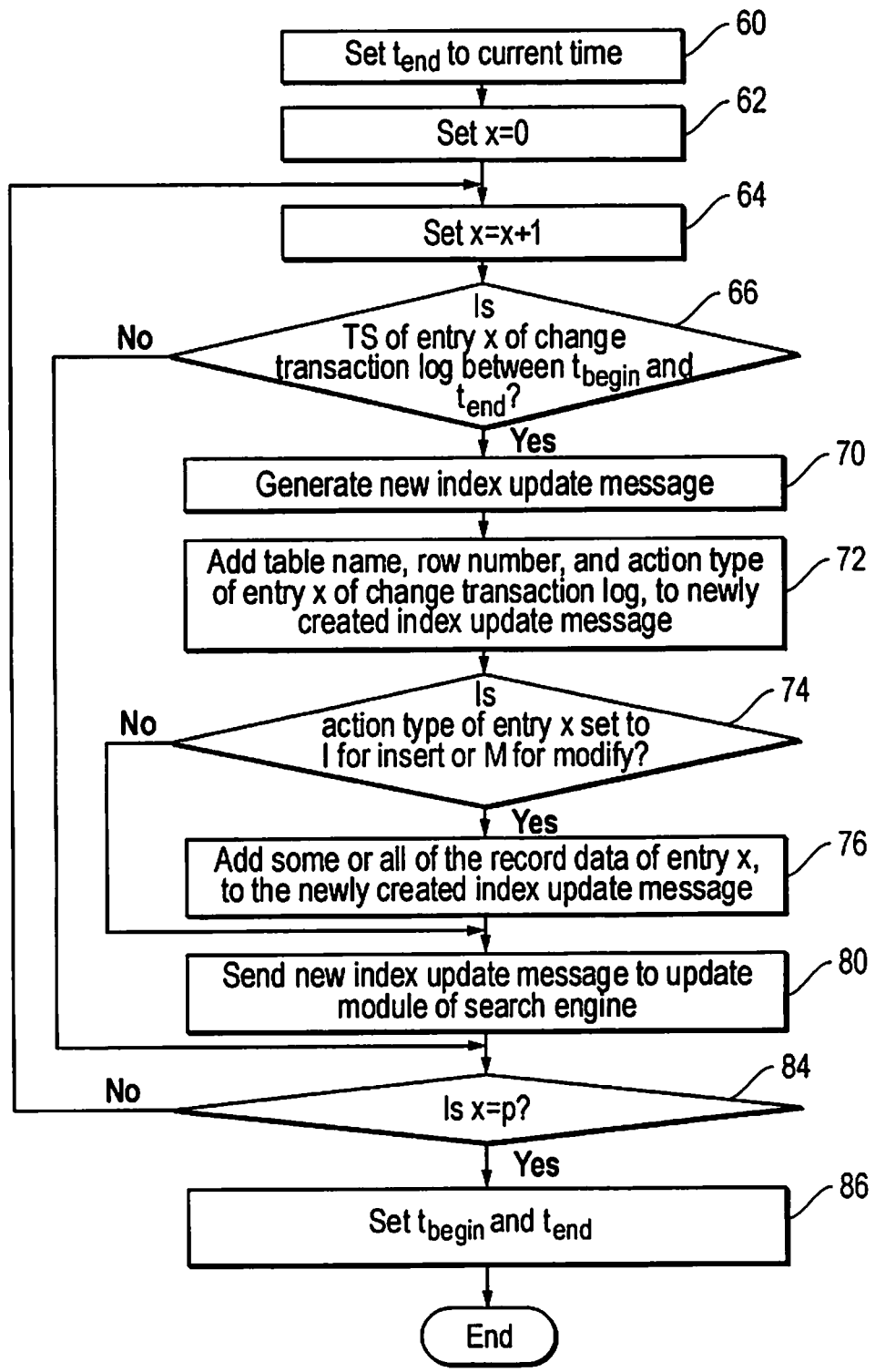
FIG. 5 illustrates relevant operational aspects of an example process that is implemented by the transaction monitor of FIG. 1.

In addition to creating and maintaining log 22, transaction monitor 20 is configured to generate and send update index messages to update search index 32. FIG. 5 illustrates relevant operational aspects of an example process that is implemented by transaction monitor 20 for generating and sending update messages to update module 30. In this example process, transaction monitor 20 generates and sends multiple update messages that correspond to respective entries in log 22, it being understood that the present invention should not be limited thereto.

The process shown in FIG. 5 begins with step 60 in which transaction monitor 20 sets a time variable $t_{end}$ to the current time (i.e., the time when the process of FIG. 5 is initiated). In step 62, transaction monitor 20 sets a counter variable x to 0. In step 62, transaction monitor 20 increments counter x by 1. Then in step 63, transaction monitor 20 accesses entry x of transaction log 22 to read the timestamp TS contained therein. Transaction monitor 20 compares timestamp TS in entry x with $t_{end}$ and $t_{begin}$, where $t_{begin}$ generally identifies the last time the process of FIG. 5 was initiated. If TS of entry x is determined to be between $t_{begin}$ and $t_{end}$, then transaction monitor 20, as shown in step 70, generates a new index update message. Transaction monitor 20 then adds the table name, row number and action type of entry x of log 22 to the update index message generated in step 70. If the action type of entry x is set to I or M, then some or all of the record data contents of entry x is added to the message as shown in step 76. Otherwise as shown in step 80, transaction monitor 20 sends the update index message to the update module 30 via communication link 26. In step 84, x is compared to p, which represents the total number of entries contained within change transaction log 22 at the time. If x does not equal p, the process is repeated after x is incremented by 1. If x does equal p in step 84, then in step 86 the transaction monitor 20 sets $t_{begin}$ to $t_{end}$ and the process ends. In an alternative embodiment entries within change transaction log 22 may be deleted once they are processed in accordance with that shown in FIG. 5, in order to reduce the amount of memory needed to store change transaction log 22.

Figure 6A:
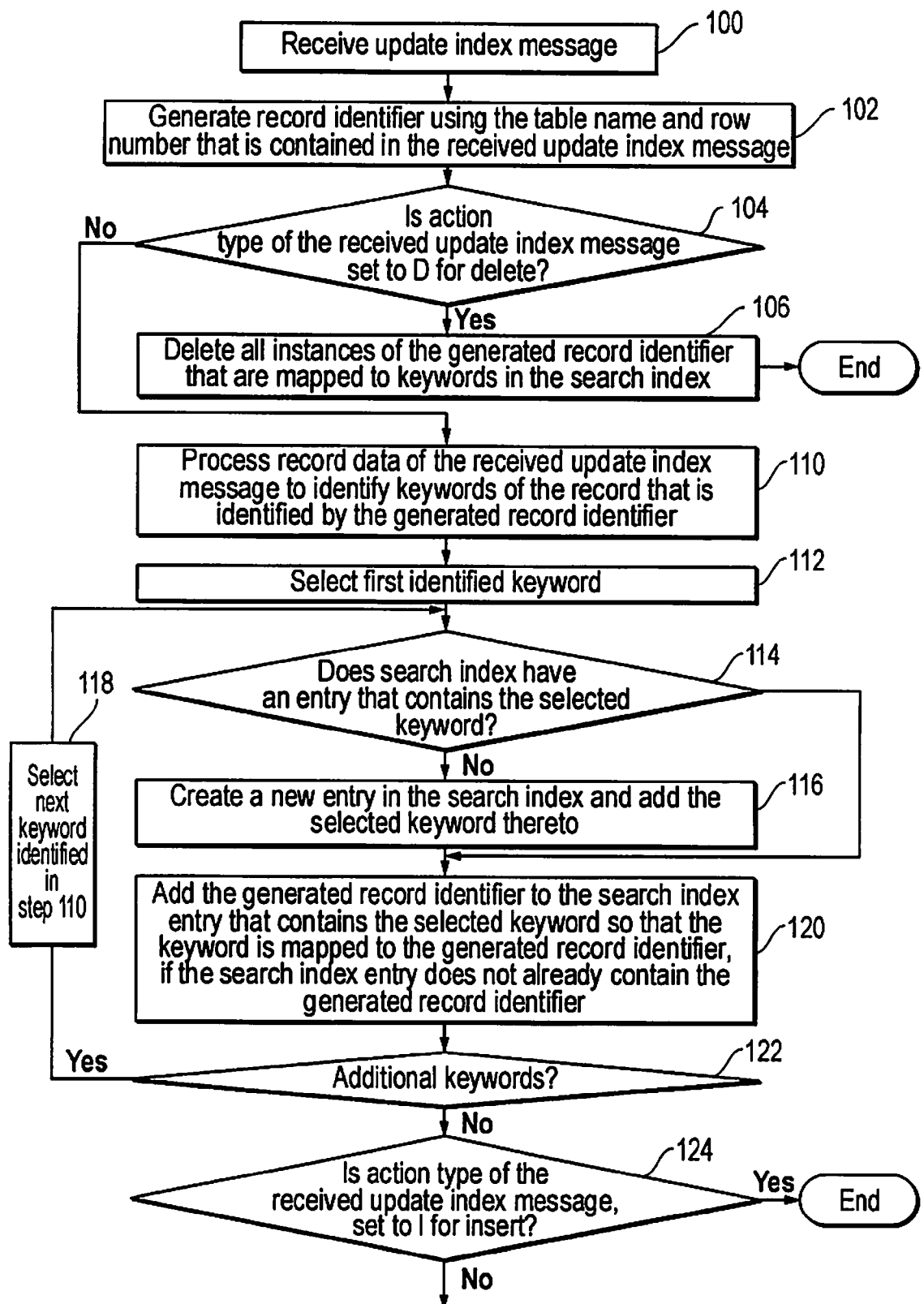
FIG. 6 illustrates relevant aspects of an example process that is performed by the index update module of FIG. 1.
Figure 6B:
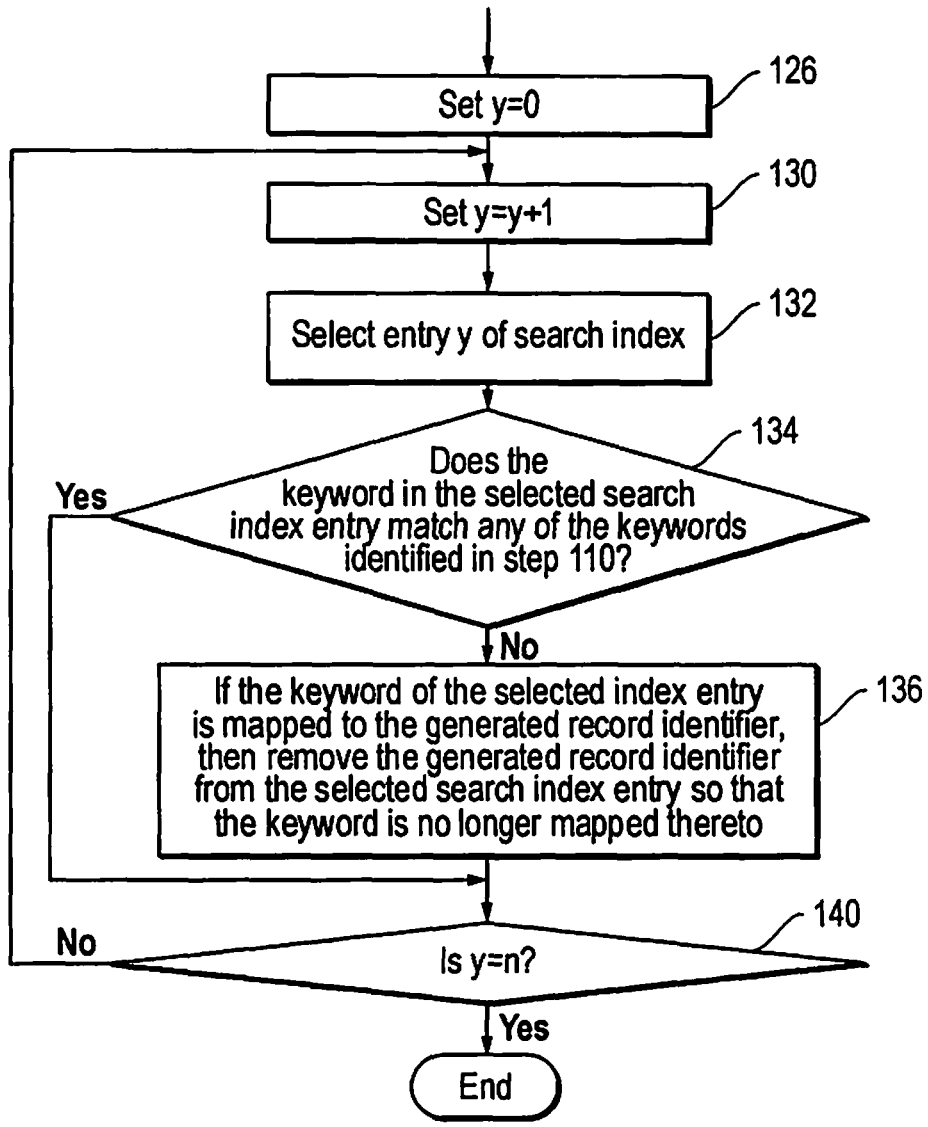

FIG. 6 illustrates relevant aspects of an example process that is performed by index update module 30 in response to receiving an index update message that was generated and sent by transaction monitor 20 in accordance with the process shown in FIG. 5. Using the process shown in FIG. 6, index update module 30 can update search index to reflect changes to the database records stored within memory system 14. In step 100, update module 30 receives an update index message from transaction monitor 20 via communication link 26. In step 102 update module 30 generates a record identifier by concatenating the table name and record row number that is contained in the received update message. In step 104, index update module 30 accesses the received update index message to determine the action type contained therein. If action type is set to D for delete, then the process proceeds to step 106 where index update module 30 removes or deletes all instances of the generated record identifier from entries of search index 32 that are mapped to keywords. Once all the instances of the generated data object identifier are deleted in accordance with step 106, the process ends.

If the action type of the received update message is not set to D for delete, then the action type is set to either I for insert or M for modify, and the received update index message should include data (e.g., a copy of some or all of the data contained in the modified or newly inserted record, or other information) that can be used by a search engine 24 to identify keywords that are contained within the corresponding modified or newly inserted record. In step 110 search engine 24 or update index module 30 processes the aforementioned data to identify keywords using the data of the received update index message. Once the keywords of the modified or newly inserted record are identified, update module 30 selects the first keyword and searches index 32 to determine whether the selected keyword is contained therein as shown in step 114. If the selected keyword is not found within search index 32, index update module 30 creates a new entry and adds the selected keyword thereto as shown in step 116. In step 120, the update module 30 adds the record identifier that was generated in step 102 to the entry that contains the selected keyword so that it is mapped thereto, if the entry does not already contain the record identifier.

All keywords that were identified in step 110 should be processed in accordance with steps 114-120. Once done, update module 30 determines whether the action type of the received update index message is set to I for insert as shown in step 124. If the action type is set to I, the process ends. If action type of the received message is set to M for modify, the process proceeds to steps 126-140 in which index update module 30 seeks to remove keywords from search index 32 that are no longer contained within the corresponding modified record. In step 126 update module 30 sets a counting variable y to zero and increments this variable in step 130. Thereafter, entry y of the search index 32 is accessed to determine whether it contains the record identifier that was generated in step 102 and whether the keyword contained within entry y is also contained within the list of keywords that were identified in step 110. In step 136, index module 30 will delete the record identifier that was generated in step 102, from entry y if the keyword of entry y is not also contained in the identified keywords of the modified record. Each entry of the search index is checked in accordance with steps 134 and 136 until all of the entries of the search index are checked.

The process shown in FIG. 5 can be initiated at regularly scheduled intervals or in response to a command received from a system administrator. Alternatively, transaction monitor 30 may generate update index messages immediately in response to receiving a record change transaction that was generated by application 12. In this embodiment, there may be no need for change transaction log 22. In other words, when transaction monitor 20 receives or detects a change record transaction, the transaction monitor generates and sends a message immediately to update module 30 without first creating an entry in log 22, wherein the message includes information needed by index update module 30 for updating search index 32 in accordance with the process shown in FIG. 6.

Although the invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
detecting, by a first transaction monitor of a plurality of transaction monitors that are coupled to a database, a first transaction that is configured to delete a first record in a first table of the database;
in response to the detecting the first transaction, generating a first message that comprises a first identifier that identifies the first record within the first table;
in response to the detecting the first transaction, generating a first entry, corresponding to the first transaction, in a transaction log of the first transaction monitor;
identifying a timestamp associated with the first entry in the transaction log;
identifying a timestamp that represents a last time that an update message was transmitted to the computer system;
identifying a current timestamp;
determining whether the timestamp associated with the first entry in the transaction log is between the timestamp that represents the last time that the update message was transmitted to the computer system and the current timestamp,
wherein the first message is generated in response to determining that the timestamp associated with the first entry in the transaction log is between the timestamp that represents the last time that the update message was transmitted to the computer system and the current timestamp;
transmitting the first message to a computer system that implements a search engine and a search index; and
causing all instances of the first identifier in the search index to be deleted by the computer system, in response to the computer system receiving the first message,
wherein the all instances of the first identifier in the search index are mapped to one or more keywords in the search index, wherein the one or more keywords are included in data content of the first record.

2. The method of claim 1, further comprising:
detecting, by a second transaction monitor of the plurality of transaction monitors that are coupled to the database, a second transaction that is configured to delete a second record in a second table of the database;
in response to the detecting the second transaction, generating a second message that comprises a second identifier that identifies the second record within the second table;
transmitting the second message to the computer system that implements the search engine and the search index; and
causing all instances of the second identifier in the search index to be deleted by the computer system, in response to the computer system receiving the second message.

3. The method of claim 1, further comprising:
receiving the first message at the computer system, which is separate from the first transaction monitor.

4. The method of claim 1, further comprising:
generating the first identifier.

5. The method of claim 1, further comprising:
receiving the first message at the computer system; and
in response to the receiving the first message, deleting all instances of the first identifier in entries of the search index.

6. The method of claim 1, wherein the generating the first entry in the transaction log is performed before the first transaction is performed.

7. The method of claim 1, further comprising:
adding a table name for the first table, a row number for the first record, and an action type corresponding to the first transaction to the first message.

8. The method of claim 1, further comprising:
in response to the generating the first entry in the transaction log, incrementing a counter;
after the transmitting the first message to the computer system, comparing the counter to a number representing a total number of entries in the transaction log; and
in response to determining that the counter is equal to the number representing the total number of entries in the transaction log, setting a timestamp representing a last time that an update message was transmitted to the computer system to a current timestamp.

9. The method of claim 1, further comprising:
deleting the first entry in the transaction log, after the computer system has deleted all instances of the first identifier in the search index.

10. A method comprising:
receiving, at a computer system that implements a search engine and a search index that maps keywords to identifiers, a first message that comprises a first identifier of a first record in a first table of a database and information that indicates that the first record will be deleted, from a first transaction monitor of a plurality of transaction monitors that are coupled to the database,
wherein the first message is generated based on a timestamp associated with a first entry, corresponding to a first transaction associated with the first message, in a transaction log of the first transaction monitor; and
in response to the receiving the first message, deleting all instances of the first identifier from the search index,
wherein the all instances of the first identifier in the search index are mapped to one or more keywords in the search index, wherein the one or more keywords are included in data content of the first record.

11. The method of claim 10, further comprising:
generating the first identifier of the first record using information related to the first identifier.

12. The method of claim 10, wherein
the information related to the first identifier is the first identifier.

13. The method of claim 10, wherein the information related to the first identifier comprises an identifier of the first table and an identifier of the first record in the first table.

14. One or more non-volatile computer readable memories (CRMs) comprising computer executable instructions, wherein a method is implemented in response to executing the computer executable instructions, the method comprising:
detecting, by a first transaction monitor of a plurality of transaction monitors that are coupled to a database, a first transaction that is configured to delete a first record in a first table of the database;
generating a first message that comprises a first identifier that identifies the first record within the first table, in response to the detecting the first transaction;
in response to the detecting the first transaction, generating a first entry, corresponding to the first transaction, in a transaction log of the first transaction monitor;
identifying a timestamp associated with the first entry in the transaction log;
identifying a timestamp that represents a last time that an update message was transmitted to the computer system;
identifying a current timestamp;
determining whether the timestamp associated with the first entry in the transaction log is between the timestamp that represents the last time that the update message was transmitted to the computer system and the current timestamp,
wherein the first message is generated in response to determining that the timestamp associated with the first entry in the transaction log is between the timestamp that represents the last time that the update message was transmitted to the computer system and the current timestamp;
transmitting the first message to a computer system that implements a search engine and a search index; and
causing all instances of the first identifier in the search index to be deleted by the computer system, in response to the computer system receiving the first message,
wherein the all instances of the first identifier in the search index are mapped to one or more keywords in the search index, wherein the one or more keywords are included in data content of the first record.

15. A non-volatile computer readable memory (CRM) comprising computer executable instructions, wherein a method is implemented in response to executing the computer executable instructions, the method comprising:
receiving, at a computer system that implements a search engine and a search index that maps keywords to identifiers, a first message that comprises a first identifier of a first record in a first table of a database and information that indicates that the first record will be deleted, from a first transaction monitor of a plurality of transaction monitors that are coupled to the database,
wherein the first message is generated based on a timestamp associated with a first entry, corresponding to a first transaction associated with the first message, in a transaction log of the first transaction monitor; and
in response to the receiving the first message, deleting all instances of the first identifier from the search index,
wherein the all instances of the first identifier in the search index are mapped to one or more keywords in the search index, wherein the one or more keywords are included in data content of the first record.

16. The CRM of claim 15, wherein the method further comprises:
generating the first identifier of the first record using information related to the first identifier.

17. The CRM of claim 15, wherein
the information related to the first identifier is the first identifier.

18. The CRM of claim 15, wherein
the information related to the first identifier comprises an identifier of the first table and an identifier of the first record in the first table.

* * * * *